Patented Sept. 7, 1954

2,688,552

UNITED STATES PATENT OFFICE 2,688,552

ABALONE PROCESSING

Melville Sahyun, Santa Barbara, Calif.

No Drawing. Application December 10, 1952,
Serial No. 325,206

3 Claims. (Cl. 99—111)

This invention relates to a method for processing abalone meat and is more particularly concerned with a simple enzymatic procedure for separating the slimy, dark, proteinaceous, mucous-like material which normally covers the surfaces of the abalone after removal from the shell from edible abalone meat.

Among the foods having a high protein value with a low calorie content and noted for their distinctive flavor is abalone meat. Abalone occur in abundance in the ocean off the coast of California and are normally obtained by diving. The inside white section of the abalone is regarded as the edible portion. However, the meat of the abalone when separated from its shell is surrounded by a slimy, dark, proteinaceous, mucous-like material which must be separated from the white or dark edible portion of abalone meat. Prior to the provisions of this invention, the usual practice was to trim this dark proteinaceous matter from the white meat using knives. For the meat's salability, it was essential that all of the dark portion be removed. Since the inter-face between the two sections is jagged, it was impossible in usual commercial practice to separate this dark proteinaceous matter from the white meat without a concomitant loss of approximately 25 to 30 percent of the white meat, which was trimmed along with the dark proteinaceous matter. When the usual selling price of abalone meat is considered, in combination with the fact that vigorous conservation programs have been instituted to protect abalone, it will be seen that a 25–30 percent loss is uneconomical. Further, it is essential that all the dark proteinaceous matter be separated from the white meat, because white abalone meat containing a residue of this dark proteinaceous matter has little, if any, sale value.

It is, therefore, a principal object of the present invention to provide a process for separating the dark proteinaceous matter from the white abalone meat without a substantial loss of the edible portion of the abalone. It is a further object of the present invention to accomplish such purpose using an economical enzymatic technique. It is a still further object of the present invention to provide a process for the separation of dark proteinaceous matter from white abalone meat by an economical enzymatic technique in combination with a brushing procedure. Other objects will become apparent hereinafter.

The foregoing and additional objects have been accomplished by the provision of a procedure whereby abalone is mechanically separated from its shell, the resulting meat is introduced into an aqueous acidic solution containing pepsin for a period of time between about 15 minutes and about one hour, preferably between about one half hour and 45 minutes, treated abalone removed from the aqueous solution, and brushed or otherwise rubbed so as to separate the dark proteinaceous matter removed from the edible portion.

The aqueous solution used to separate the dark proteinaceous matter contains the enzyme pepsin in an acidic aqueous solution. Pepsin is usually employed in an amount between about 0.2 gram and 5 grams per liter of pepsin having a potency of 1:10,000 U. S. P. units or at a concentration between about 2 and about 50 units per milliliter. Preferably about 10–15 U. S. P. units of pepsin per milliliter of solution are used. The acidity of the solution is maintained between about pH 1.0 and pH 3.0 for the initial stages of the treatment. Since pepsin has an optimum activity for hydrolysis purposes of a pH of between about 1.5 and 2, a preferred embodiment of the present invention contemplates that the solution be maintained at this pH during the treatment. Room temperature is usually employed; however, other temperatures may be used if desired. The amount of solution necessary is that amount which will completely cover all abalone to be treated. If less is employed, there will not be a complete loosening of the dark proteinaceous matter from the white abalone meat, and for economic reasons excessive amounts are not usually employed.

An acid which is water soluble and will give a pH between about 1.5 and 2 may be employed in the process of the present invention. For example, such acids include sulfuric acid, phosphoric acid, nitric acid, etc. Because of its availability, ease of handling, and cheap cost, hydrochloric acid is preferred.

The abalones will be maintained in this solution for a period of at least 15 minutes. However, I have found that a period of time between about 30 and 45 minutes is preferred, as this gives the enzymes suitable time to solubilize the dark, proteinaceous matter. If the abalones are allowed to remain in solution for a period of time in excess of two hours, the solubilized dark proteinaceous matter may permeate the white abalone meat, dark streaks evidencing such permeation. This is undesirable because only white abalone meat has the full sale value. It is important that the solution be maintained acid during the enzymatic reaction not only for the purpose of causing an optimum pepsin activity, but also to prevent the growth of bacteria with a concomitant production of poisonous materials.

After the suitable time, the abalone meat is removed from the acidified solution containing the enzyme pepsin which will, at this time, retain substantial quantities of the dark, proteinaceous matter. However, there still will be attached to the white abalone meat a certain percentage of the dark proteinaceous matter. This matter will be easily removed by brushing the abalone with a scrub brush, or other suitable treatment such as rubbing with one's fingers, or a cloth, etc.

It will be found that following the process of this invention, substantially none of the white abalone meat is lost by the procedure separating the dark proteinaceous matter.

The following example illustrates the procedure of the present invention but is not to be construed as limiting the invention thereto.

*Example*

About 2.5 liters of one-tenth Normal hydrochloric acid was added to 5 grams of pepsin having a potency of 1:10,000 U. S. P. units. To the resulting solution was added five pounds of abalone meat which had been freshly separated from its shell. After standing for 30 minutes in this solution, the abalone was removed and washed with water. Most of the dark proteinaceous matter went into suspension and remained in the solution or was removed in the wash water. A small amount of dark matter which remained was removed by scrubbing with an ordinary scrub brush, leaving the white edible portion of the abalone meat. There was substantially no white abalone meat lost by this treatment.

Without the acidic aqueous pepsin treatment of the present invention, the dark proteinaceous matter can only be removed by cutting; brushing, scrubbing or rubbing will not separate the dark proteinaceous matter adhering to the surfaces of the white meat. While other enzymes such as trypsin, papain, taka-diastase, etc., are capable of hydrolyzing this dark proteinaceous matter, they are not satisfactory because of economic reasons and sanitation difficulties.

Various modifications may be made in the method of the present invention without departing from the spirit or scope thereof and it is understood that I limit myself only as defined in the appended claims.

I claim:

1. A process for removing the dark proteinaceous matter normally surrounding white abalone meat which includes: adding abalone as removed from the shell to an acidic aqueous solution containing pepsin, separating the treated abalone meat therefrom and rubbing the abalone meat so as to remove the remaining dark proteinaceous matter.

2. A process for removing the dark proteinaceous matter normally surrounding white abalone meat which includes: adding abalone as removed from the shell to an acidic aqueous solution, maintained at a pH between 1 and about 3.7, containing between about 2 and about 50 U. S. P. units of pepsin per milliliter, separating the treated abalone from the resulting mixture, washing, and rubbing so as to remove any remaining dark proteinaceous matter from white meat.

3. The process for removing the dark proteinaceous matter normally surrounding white abalone meat which includes: mechanically separating abalone from its shell, adding the separated abalone to an acidic aqueous solution, maintained at a pH between about 1.5 and 2, and containing 10–15 U. S. P. units of pepsin per milliliter of solution, removing the treated abalone from the solution after treating for 45 minutes, washing the separated abalone, and rubbing so as to remove any traces of dark proteinaceous matter from white abalone meat.

References Cited in the file of this patent

UNITED STATES PATENTS

| Number | Name | Date |
|---|---|---|
| 783,840 | Kerr | Feb. 28, 1905 |
| 1,370,049 | Satow | Mar. 1, 1921 |
| 2,294,428 | Stockhamer | Sept. 1, 1942 |
| 2,512,375 | Parfentjev | June 20, 1950 |

FOREIGN PATENTS

| Number | Country | Date |
|---|---|---|
| 549,613 | Great Britain | Nov. 30, 1942 |